(12) United States Patent
Vermeir (10) Patent No.: US 7,969,108 B2
(45) Date of Patent: Jun. 28, 2011

(54) CONTROL CIRCUIT FOR A BRUSHLESS DC MOTOR AND METHOD THEREFOR

(75) Inventor: Sam J. B. W. Vermeir, Mechelen (BE)

(73) Assignee: Semiconductor Components Industries, LLC, Phoenix, AZ (US)

( * ) Notice: Subject to any disclaimer, the term of this patent is extended or adjusted under 35 U.S.C. 154(b) by 435 days.

(21) Appl. No.: 12/327,512

(22) Filed: Dec. 3, 2008

(65) Prior Publication Data

US 2010/0134060 A1 Jun. 3, 2010

(51) Int. Cl.
*H02P 6/18* (2006.01)
(52) U.S. Cl. ............... 318/400.32; 318/254.1; 318/696; 318/599; 318/700; 318/400.01; 318/400.06; 318/400.24; 318/400.29
(58) Field of Classification Search .............. 318/254.1, 318/696, 599, 700, 400.01, 400.06, 400.24, 318/400.29, 400.32
See application file for complete search history.

(56) References Cited

U.S. PATENT DOCUMENTS

| | | | | |
|---|---|---|---|---|
| 3,947,738 | A * | 3/1976 | Oliver | ............................ 388/806 |
| 5,764,024 | A | 6/1998 | Wilson | |
| 6,054,825 | A | 4/2000 | Hayner | |
| 6,121,736 | A * | 9/2000 | Narazaki et al. | ......... 318/400.35 |
| 6,680,593 | B2 * | 1/2004 | Gotou | ...................... 318/400.04 |
| 6,724,166 | B2 * | 4/2004 | Narumi et al. | ............ 318/400.23 |
| 6,979,966 | B2 * | 12/2005 | Barrenscheen et al. | . 318/400.01 |
| 7,106,013 | B2 * | 9/2006 | Narumi et al. | ........... 318/400.25 |
| 7,285,930 | B2 * | 10/2007 | Weinmann et al. | ...... 318/400.31 |
| 7,786,690 | B2 * | 8/2010 | Hoda | ........................... 318/599 |
| 2007/0241705 | A1 | 10/2007 | Karwath | |
| 2008/0197794 | A1 | 8/2008 | Vermeir et al. | |

OTHER PUBLICATIONS

G. H. Jang and M. G. Kim, "Optimal Communication of a BLDC Motor by Utilizing the Symmetric Terminal Voltage", IEEE Transactions on Magnetics, vol. 42, No. 10, Oct. 2006, pp. 3473-3475.

* cited by examiner

*Primary Examiner* — Rita Leykin
(74) *Attorney, Agent, or Firm* — Paul J. Polansky (57) ABSTRACT

A control circuit (120, 140) for a brushless direct current (DC) motor (160) includes a current drive circuit (140), a current loop regulator (122), and a commutation loop regulator (124, 126). The current drive circuit (140) is adapted to drive the brushless DC motor (160) in a first polarity or a second polarity selectively in response to a control signal, and senses a current through the brushless DC motor (160) to provide a current sense signal. The current loop regulator (122) varies a duty cycle of the control signal to regulate the current in response to the current sense signal, and regulates the polarity of the current based on a state of a polarity signal. The commutation loop regulator (124, 126) regulates a transition of said polarity signal in response to a comparison of a pre-commutation duty cycle value and a post-commutation duty cycle value.

20 Claims, 4 Drawing Sheets

CONTROL CIRCUIT FOR A BRUSHLESS DC MOTOR AND METHOD THEREFOR

CROSS REFERENCE TO RELATED, COPENDING APPLICATION

Related subject matter is found in a copending patent application entitled "Method and apparatus for driving a DC motor," application Ser. No. 11/968,591, filed Jan. 2, 2008, invented by Sam Vermeir and assigned to the assignee hereof.

FIELD OF THE DISCLOSURE

The present disclosure relates generally to motor controllers, and more particularly relates to motor controllers that commutate brushless direct current motors.

BACKGROUND

A brushless single-phase direct current (DC) motor typically includes a rotor containing one or more permanent magnets and a stator containing a winding. A current is applied to the stator winding to produce a magnetic field, and the rotor is induced to rotate due to opposition between the respective rotor and the stator magnetic fields. The direction of current flow in the stator winding must be reversed twice for each revolution of a two-pole rotor in order to provide successive field opposition as the rotor rotates. The act of changing the direction of the flow of current in the stator winding is referred to as commutation. The mechanical power provided by a motor is dependent on when the commutation is performed relative to a back electromotive force (BEMF) that is induced in the stator winding by the magnetic field of the rotating rotor.

A sensor such as a Hall effect sensor can be used to identify the angular position of the rotor, but this technique requires an additional electronic controller to effectively predict an ideal commutation time. Moreover a Hall effect sensor adds cost to the product. Other techniques for determining commutation time, such as the use of extra stator windings to directly sense the BEMF, and still other techniques that attempt to monitor the BEMF by detecting variation in stator current supplied by a motor controller, also do not predict the ideal commutation time and/or add to the product cost. Motor efficiency can be improved if commutation time can be better controlled.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items.

DETAILED DESCRIPTION

Figure 1:
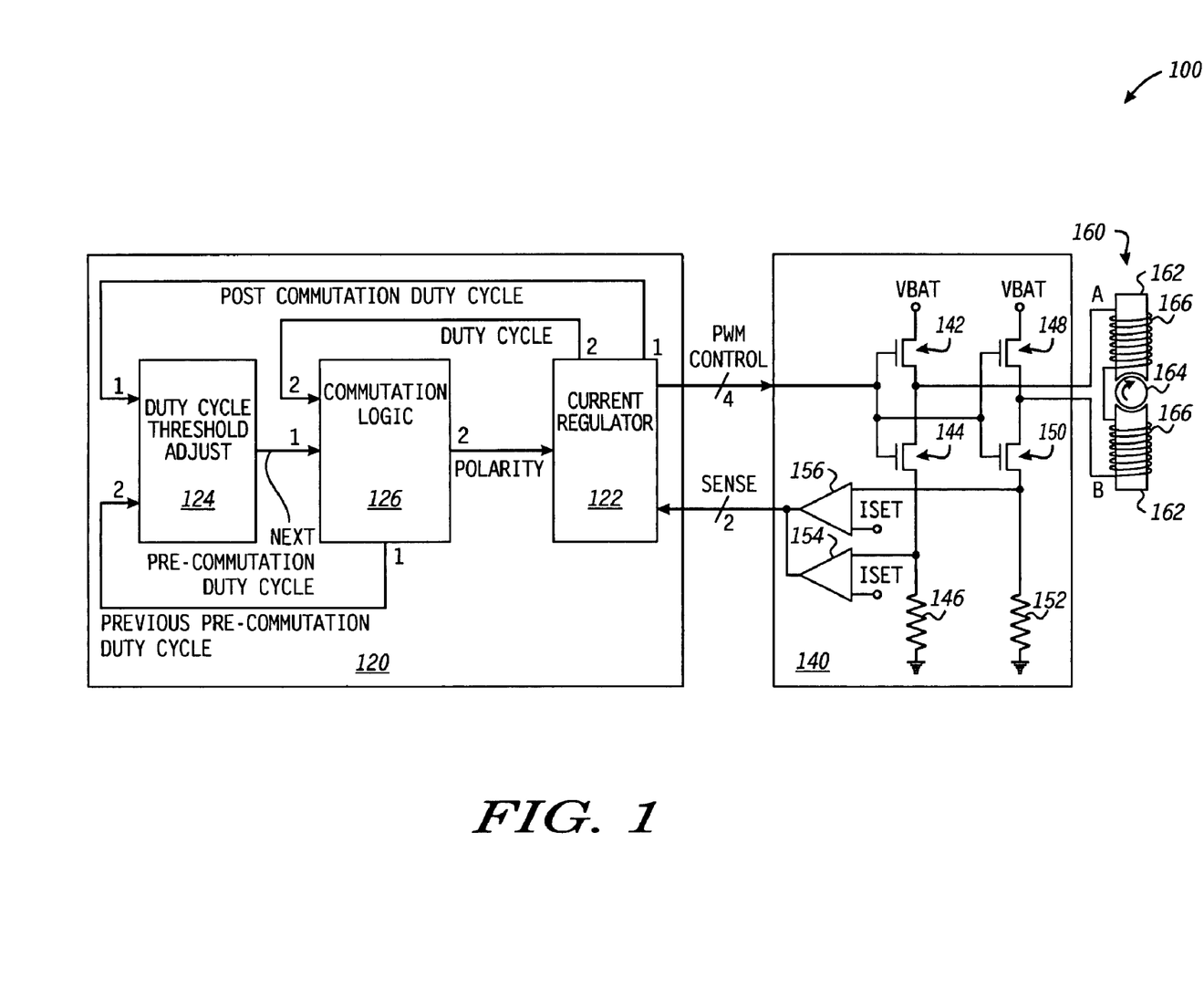
FIG. 1 illustrates in partial block diagram and partial schematic form a brushless direct current (DC) motor system according to the present invention.

FIG. 1 illustrates in partial block diagram and partial schematic form a brushless DC motor system 100 according to the present invention. Motor system 100 includes a feedback control module 120, a current drive circuit 140, and a brushless DC motor 160. Feedback control module 120 and current drive circuit 140 together form a control circuit for regulating the operation of motor 160.

Feedback control module 120 includes a current regulator circuit 122, a duty cycle threshold adjust circuit 124, and a commutation logic circuit 126. Duty cycle threshold adjust circuit 124 has a first input to receive a signal labeled "POST-COMMUTATION DUTY CYCLE," a second input to receive a signal labeled "PREVIOUS PRE-COMMUTATION DUTY CYCLE," and an output to provide a signal labeled "NEXT PRE-COMMUTATION DUTY CYCLE." Commutation logic circuit 126 has a first input to receive a signal labeled "DUTY CYCLE," a second input to receive signal NEXT PRE-COMMUTATION DUTY CYCLE from the output of duty cycle threshold adjust circuit 124, a first output to provide signal PREVIOUS PRE-COMMUTATION DUTY CYCLE to the second input of duty cycle threshold adjust circuit 124, and a second output to provide a signal, labeled "POLARITY." Current regulator circuit 122 has a first input to receive signal POLARITY from commutation logic circuit 126, a first output to provide signal DUTY CYCLE to commutation logic circuit 126, a second output to provide signal POST-COMMUTATION DUTY CYCLE to duty cycle threshold adjust circuit 124, and an interface to current drive circuit 140 that includes four output signals, collectively labeled "PWM CONTROL," and two input signals, collectively labeled "SENSE."

Current drive circuit 140 includes metal oxide semiconductor field effect transistor (MOSFET) devices 142, 144, 148, and 150, resistors 146 and 152, and comparators 154 and 156. MOSFET 142 has a drain to receive a signal labeled "VBAT," a gate to receive a first PWM CONTROL signal, and a source connected to a node labeled "A." MOSFET 144 has a drain connected to node A, a gate to receive a second PWM CONTROL signal, and a source. Resistor 146 has a first terminal connected to the source of MOSFET 144, and a second terminal connected to ground. Comparator 154 has a first input connected to the source of MOSFET 144, a second input to receive a signal labeled "ISET," and an output to provide a first SENSE signal to current regulator 122.

MOSFET 148 has a drain to receive signal VBAT, a gate to receive a third PWM CONTROL signal, and a source connected to a node labeled "B." MOSFET 150 has a drain connected to node B, a gate to receive a fourth PWM CONTROL signal, and a source. Resistor 152 has a first terminal connected to the source of MOSFET 150, and a second terminal connected to ground. Comparator 156 has a first input connected to the source of MOSFET 150, a second input to receive signal ISET, and an output to provide a second SENSE signal to current regulator 122.

Motor 160 includes stator poles 162, a rotor 164, and stator windings 166. Stator windings 166 have two terminals connected to nodes A and B, respectively.

Feedback control module 120 regulates the operation of motor 160 by providing PWM CONTROL signals to current drive circuit 140. The PWM CONTROL signals control the conduction of MOSFET devices 142, 144, 148, and 150 of current drive circuit 140 via pulse-width modulation (PWM) techniques in order to provide desired operating currents to stator windings 166. Feedback control module 120 controls the magnitude of the stator current, and also the commutation of the stator current. Feedback control module 120 receives SENSE signals from current drive circuit 140 that indicate when the stator current has reached a desired operating level, and modifies the duty cycle of the PWM CONTROL signals to maintain the desired operating stator current. A higher duty cycle increases stator current provided by current drive circuit 140, and a lower duty cycle decreases stator current provided by current drive circuit 140. Feedback control module 120 continuously adjusts the duty cycle of the PWM CONTROL signals due to the effect of the continuously changing BEMF signal. When the magnitude of the BEMF increases, the duty cycle of the PWM CONTROL signal must increase to maintain the desired stator current. When the magnitude of the BEMF decreases, the duty cycle of the PWM CONTROL signal is decreased to maintain the desired stator current. The duty cycle of the PWM CONTROL signals therefore provides an indication of the magnitude of the BEMF, and can thus provide insight into the angular position of the rotor at any given time.

MOSFET devices 142, 144, 148, and 150 of current drive circuit 140 form an H-bridge. During one commutation polarity, MOSFETs 142 and 150 are configured to conduct, while MOSFETs 144 and 148 are turned off, resulting in a current flowing from signal VBAT, through MOSFET 142 to node A, through windings 166 to node B, through MOSFET 150, and to ground. During the opposite commutation polarity, MOSFETs 148 and 144 are configured to conduct, while MOSFETs 142 and 150 are turned off, resulting in a current flowing from signal VBAT, through MOSFET 148, to node B, through windings 166 to node A, through MOSFET 144, and to ground. Thus, the direction of current through stator winding 166 is based on which commutation polarity is active at a particular time. Each full rotation of rotor 164 includes a positive, and a negative commutation interval. Comparator 154 asserts the first SENSE signal when the stator current provided by MOSFETs 148 and 144 are turned on and reaches a desired operating level determined by signal ISET. Comparator 156 asserts the second SENSE signal when the stator current provided by MOSFETs 142 and 150 are turned on and reaches a desired operating level determined by signal ISET. Signal POLARITY specifies which commutation interval is active.

Figure 2:
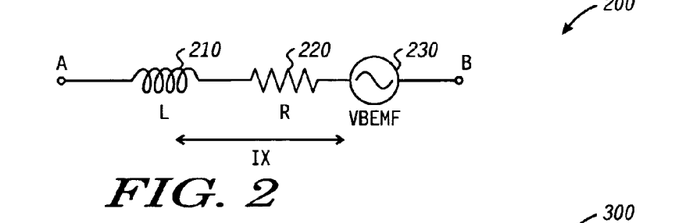
FIG. 2 illustrates in schematic form an electrical model of the brushless DC motor of FIG. 1.

FIG. 2 illustrates in schematic form an electrical model 200 of the brushless DC motor 160 of FIG. 1. Model 200 includes an inductor 210 labeled "L," a resistor 220 labeled "R," and a voltage source 230 labeled "VBEMF" connected in series between terminals A and B. Inductor 210 and resistor 220 correspond to the electrical properties of stator winding 166, and voltage source VBEMF represents a voltage induced in the stator winding by the law of Faraday-Lenz, due to the movement of stator winding 166 within the magnetic field provided by the magnetic field provided by rotor 164. As shown in FIG. 2, an instantaneous current labeled "IX" flows through stator 162.

Figure 3:
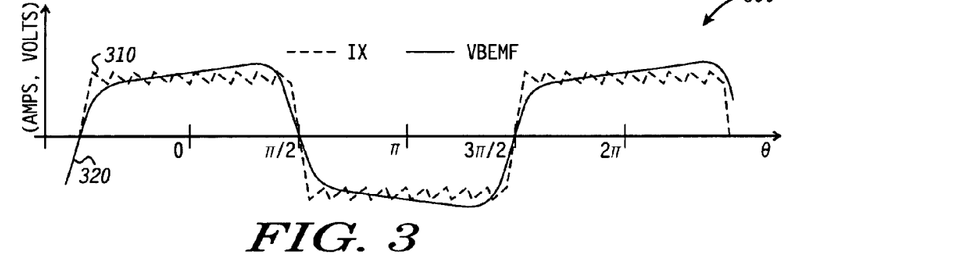
FIG. 3 is a graph illustrating an ideal relationship between stator current and BEMF voltage level during operation of the brushless DC motor system of FIG. 1.

FIG. 3 is a graph 300 illustrating an ideal relationship between stator current and BEMF voltage during operation of the brushless DC motor system of FIG. 1. Graph 300 has a horizontal axis representing the rotational angle theta in radians, and a vertical axis representing signal amplitude in either amperes or volts as appropriate. Graph 300 includes a waveform 310 representing stator current IX in amperes and waveform 320 representing voltage source VBEMF in volts, both illustrated at FIG. 2. When signal IX and VBEMF are substantially in phase with each other, motor 160 is operating at substantially optimal efficiency with regard to mechanical power delivered by motor 160. Note that the characteristics of VBEMF waveform 320 can vary considerably and are determined by rotor geometry, motor speed, and other design attributes. VBEMF waveform 320 can be sinusoidal, trapezoidal, or highly complex. As shown in FIG. 3, VBEMF is a clipped and distorted sine wave. The phase relationship between IX and VBEMF is partially determined by when feedback control module 120 initiates commutation of the stator current IX.

Figure 4:
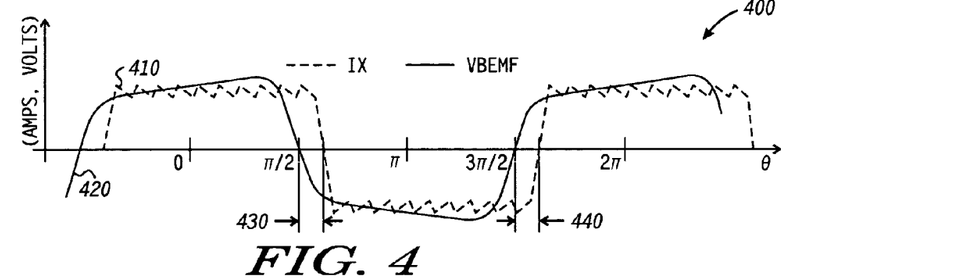
FIG. 4 is a graph illustrating the relationship between stator current and BEMF voltage during operation of the brushless DC motor system of FIG. 1 when commutation is initiated too late.

FIG. 4 is a graph 400 illustrating the relationship between stator current and BEMF voltage during operation of brushless DC motor system 400 of FIG. 1 when commutation is initiated too late. Graph 400 has a horizontal axis representing the rotational angle theta in radians, and a vertical axis representing signal amplitude in either amperes or volts as appropriate. Waveform 410 represents stator current IX in amperes, and waveform 420 represents voltage source VBEMF in volts, both illustrated in FIG. 2. Also illustrated are rotational angle intervals 430 and 440 during which stator current IX is lagging behind signal VBEMF due to initiating commutation of stator current IX after rotor 164 has progressed past the desired angular position. During intervals 430 and 440, mechanical power provided by motor 160 is momentarily negative. Operation under this condition is inefficient and can introduce vibration in motor 160 that can accelerate wear and thus decrease the operating lifetime of motor 160.

Figure 5:
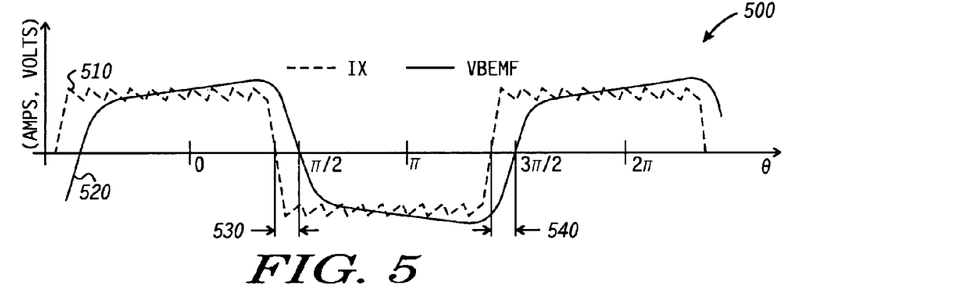
FIG. 5 is a graph illustrating the relationship between stator current and BEMF voltage during operation of the brushless DC motor system of FIG. 1 when commutation is initiated too early.

FIG. 5 is a graph 500 illustrating the relationship between stator current and BEMF voltage during operation of brushless DC motor system 100 of FIG. 1 when commutation is initiated too early. Graph 500 has a horizontal axis representing the rotational angle theta in radians, and a vertical axis representing signal amplitude in either amperes or volts as appropriate. Graph 500 includes waveform 510 representing stator current IX in amperes, and waveform 520 representing voltage source VBEMF in volts, both illustrated in FIG. 2. Also illustrated are rotational angle intervals 530 and 540 during which stator current IX is leading signal VBEMF due to initiating commutation of stator current IX prior to rotor 164 progressing to a preferred angular position. During intervals 530 and 540, mechanical power provided by motor 160 is momentarily negative. Operation under this condition is inefficient and can introduce vibration in motor 160 that can accelerate wear and thus decrease the operating lifetime of motor 160.

Figure 6:
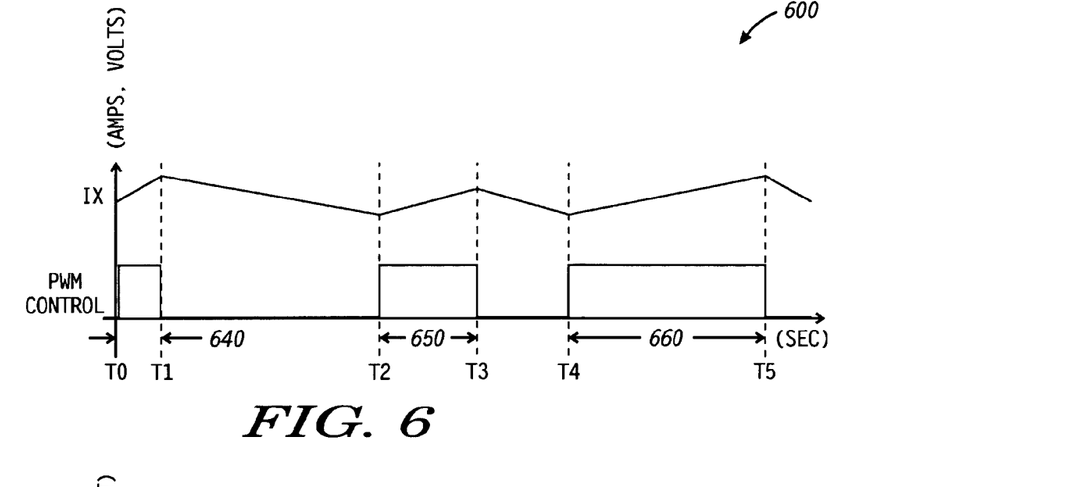
FIG. 6 is a timing diagram illustrating the operation of the current regulator circuit of the brushless DC motor system of FIG. 1.

FIG. 6 is a timing diagram 600 illustrating the operation of current regulator 122 of brushless DC motor system of FIG. 1. Timing diagram 600 includes a horizontal axis representing time in units of seconds, and a vertical axis representing signal amplitude in either amperes or volts. Timing diagram includes waveform 610 representing stator current IX in amperes, and waveform 620 representing one of the PWM CONTROL signal provided by current regulator circuit 122 of FIG. 1. FIG. 6 also illustrates a time interval 640 between time references T0 and T1, a time interval 650 between time references T2 and T3, and a time interval 660 between time references T4 and T5. Time intervals 640, 650, and 660 represent successive pulses of a PWM CONTROL signal, and illustrate variation in the duty cycle of the PWM CONTROL signal.

The period of time represented by timing diagram 600 corresponds to a substantially small angular rotation of rotor 164, such as a fraction of one degree. Timing diagram 600 illustrates variation of the duty cycle of signal PWM CONTROL to maintain a constant stator current IX, in response to varying BEMF and other losses such as resistive losses. Current regulator circuit 122 forms a part of a current loop feedback system that also includes current drive circuit 140 and motor 160. When stator current IX falls below the preferred operating level determined by signal ISET, signal SENSE is negated, and current regulator circuit 122 asserts the PWM CONTROL signals to enable current drive circuit 140 to increase stator current IX. When stator current IX meets or exceeds the level determined by signal ISET, signal SENSE is asserted and current regulator circuit 122 negates the PWM CONTROL signals, momentarily disabling current drive circuit 140 and allowing stator current Ix to decrease.

Current regulator circuit 122 adjusts the duty cycle of the PWM CONTROL signals based on the difference between stator current IX and the preferred operating level at a particular moment in time. For example, current regulator circuit 122 asserts PWM CONTROL signal 620 during time interval 640. Current regulator circuit 122 asserts PWM CONTROL signal 620 for a longer duration during time interval 650, and for still a longer duration during time interval 660, in order to compensate stator current IX as the BEMF increases. Current regulator circuit 122 performs adjustments to stator current IX rapidly resulting in substantially constant stator current IX. In an alternate embodiment, current regulator circuit 122 can instead use pulse frequency modulation (PFM), in which case current regulator circuit 122 adjusts the current by changing the number of uniform pulses during a set interval of time, wherein a greater duty cycle corresponds to a greater number of uniform pulses being provided to current drive circuit 140 during this set interval of time, and a smaller duty cycle corresponds to a fewer number of uniform pulses during the same interval of time. Since successive duty cycle values provide an indication of variation in the magnitude of BEMF, one can analyze these values to estimate the angular position of rotor 164 and to initiate commutation of the stator current IX.

Figure 7:
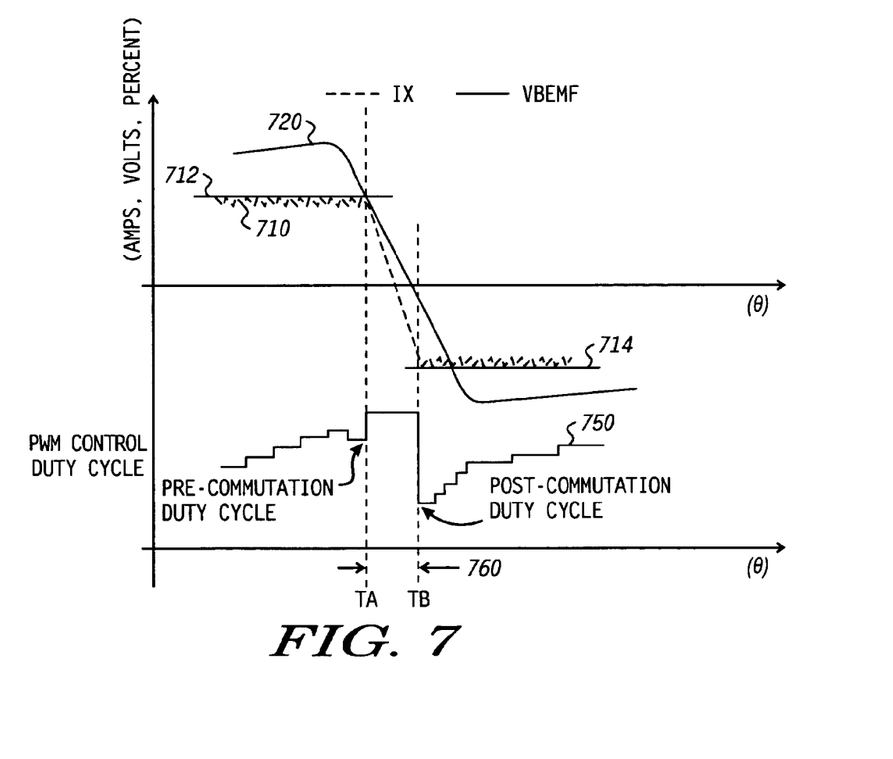
FIG. 7 is a graph illustrating duty cycles of pairs of the PWM CONTROL signals of the brushless DC motor system of FIG. 1 before and after commutation when commutation is initiated too early.

FIG. 7 is a graph 700 illustrating duty cycles of pairs of the PWM CONTROL signals of brushless DC motor system 100 of FIG. 1 before and after commutation for early commutation. Graph 700 has a horizontal axis representing the rotational angle theta in radians, and a vertical axis representing signal amplitude in either amperes, volts, or percent as appropriate. In graph 700, waveform 710 represents stator current IX in amperes, waveform 720 represents voltage source VBEMF in volts, and waveform 750 represents the duty cycle of the PWM CONTROL signals before and after stator current commutation in percentage. FIG. 7 also illustrates threshold references 712 and 714 corresponding to positive and negative stator current thresholds determined by signal ISET, respectively. Angle reference TA represents when feedback control module 120 initiates commutation of stator current IX, and angle TB represents when the value of stator current IX has reached negative stator reference 714. Interval 760 illustrates the period during which stator current IX is transitioning from threshold 712 to threshold 714. FIG. 7 also illustrates PWM CONTROL duty cycle prior to and following interval 760. The PWM CONTROL duty cycle immediately preceding angle reference TA is labeled "PRE-COMMUTATION DUTY CYCLE," and the PWM CONTROL duty cycle immediately following angle reference TB is labeled "POST-COMMUTATION DUTY CYCLE."

Current regulator circuit 122 determines the PRE-COMMUTATION DUTY CYCLE value based on the current regulator feedback loop previously described, and corresponds to the last duty cycle determined by current regulator circuit 122 before commutation is initiated at angle reference TA. Current regulator circuit 122 will typically set the PWM CONTROL duty cycle to a maximum value (i.e. 100% duty cycle) following commutation until stator current IX has reached the negative threshold at angle reference TB. Feedback control module 120 accomplishes the reversal of stator current IX relatively quickly, keeping interval 760 relatively short. At angle reference TB, current regulator circuit 122 again determines PWM CONTROL duty cycle based on the current regulator feedback loop. A POST-COMMUTATION DUTY CYCLE value is thus determined immediately following the point in time that the value of stator current IX becomes equal to reference 714.

Duty cycle threshold adjust circuit 124 and commutation logic circuit 126 together form a commutation loop regulator that controls another feedback loop that determines when to initiate stator current commutation. The commutation loop regulator identifies the commutation time over successive commutation cycles by comparing the PRE-COMMUTATION DUTY CYCLE to the POST-COMMUTATION DUTY CYCLE. The commutation loop regulator identifies the commutation time as being when the PRE-COMMUTATION DUTY CYCLE and the POST-COMMUTATION DUTY CYCLE are approximately equal in value. This commutation time is substantially optimal because the duty cycle of the PWM CONTROL signals provided by current regulator circuit 122 is correlated with the phase relationship between stator current IX and BEMF.

The operation of the commutation feedback loop can be better understood by referring back to FIG. 1 in association with FIG. 7. Prior to the desired commutation time, BEMF begins to decrease. An initial guess at a commutation time can be asserted based on a particular value of the PWM CONTROL duty cycle selected after the duty cycle begins to decrease in value. Commutator logic 126 changes the state of the POLARITY signal at this particular value (at angle reference TA), and provides this value, the PRE-COMMUTATION DUTY CYCLE, to duty cycle threshold adjust circuit 124 via signal PREVIOUS PRE-COMMUTATION DUTY CYCLE. Once the stator current IX reaches threshold 714 at angle reference TB, the current regulation feedback loop, and current regulator circuit 122 specifically, adjusts the duty cycle of PWM CONTROL as necessary to maintain stator current IX at the level determined by signal ISET.

Current regulator 122 provides the initial duty cycle following angle reference TB to duty cycle threshold adjust circuit 124 via signal POST-COMMUTATION DUTY CYCLE. Duty cycle threshold adjust circuit 124 compares the values of PREVIOUS PRE-COMMUTATION DUTY CYCLE and POST-COMMUTATION DUTY CYCLE, and determines a next duty cycle value at which commutation will be initiated. Duty cycle threshold adjust circuit 124 provides this value to commutation logic circuit 126 via signal NEXT PRE-COMMUTATION DUTY CYCLE. Commutation logic circuit 126 toggles signal POLARITY to initiate commutation when the duty cycle of PWM CONTROL decreases to the value specified by signal NEXT PRE-COMMUTATION DUTY CYCLE.

If the PRE-COMMUTATION DUTY CYCLE is greater than the POST-COMMUTATION DUTY CYCLE, then the next PRE-COMMUTATION DUTY CYCLE value will be set to a smaller value than selected during the previous commutation. If the PRE-COMMUTATION DUTY CYCLE is less than the POST-COMMUTATION DUTY CYCLE, then the next PRE-COMMUTATION DUTY CYCLE value will be set to a larger value than selected during the previous commutation. The iteration continues, making substantially small corrective changes to the PRE-COMMUTATION DUTY CYCLE, until the PRE-COMMUTATION DUTY CYCLE and the POST-COMMUTATION DUTY CYCLE are approximately equal in value. The iterative process described can be performed using immediately successive commutation events, or by evaluating commutations less frequently. For example, convergence of the feedback loop to identify the substantially optimal commutation time can be accomplished by evaluating the PRE-COMMUTATION DUTY CYCLE and POST-COMMUTATION DUTY CYCLE values during one commutation for every thousand commutations.

The value of PRE-COMMUTATION DUTY CYCLE of PWM CONTROL illustrated in FIG. 7 is greater than the value of POST-COMMUTATION DUTY CYCLE, indicating that commutation was initiated too early. Therefore, duty cycle threshold adjust circuit 124 will adjust the value of signal NEXT PRE-COMMUTATION DUTY CYCLE to be slightly smaller than the previous PRE-COMMUTATION DUTY CYCLE value, and commutation logic 126 initiates commutation when the duty cycle of PWM CONTROL has decreased to the new PRE-COMMUTATION DUTY CYCLE value. Adjustment of the PRE-COMMUTATION DUTY CYCLE value is typically made in small steps. For example, if current regulator circuit 122 is capable of providing 128 unique duty cycle values, and the current value of PRE-COMMUTATION DUTY CYCLE is 93, then duty cycle threshold adjust circuit 124 sets the next PRE-COMMUTATION DUTY CYCLE value to 92. Other techniques, including a binary search algorithm, or a form of smoothing algorithm may also be used to control the rate of convergence of the commutation feedback loop.

Figure 8:
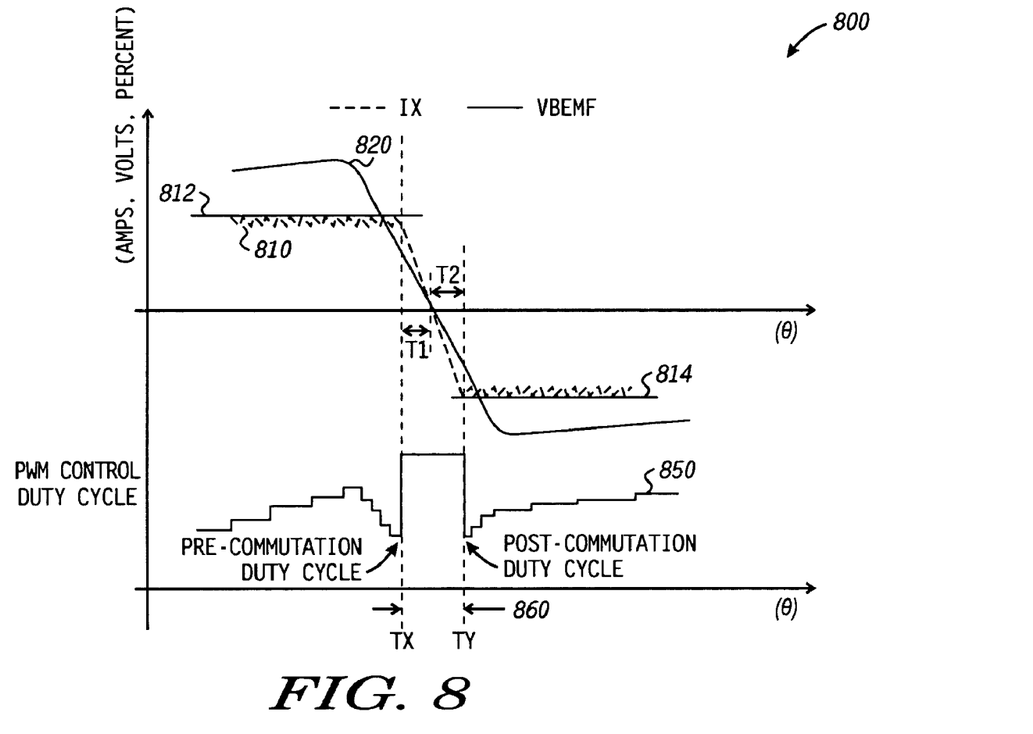
FIG. 8 is a graph illustrating duty cycles of pairs of the PWM CONTROL signals of the brushless DC motor system of FIG. 1 before and after commutation when commutation is initiated at an ideal time.

FIG. 8 is a graph 800 illustrating duty cycles of pairs of the PWM CONTROL signals of the brushless DC motor system of FIG. 1 before and after commutation when commutation is initiated at an ideal time. Graph 800 has a horizontal axis representing the rotational angle theta in radians, and a vertical axis representing signal amplitude in either amperes, volts, or percent as appropriate. Waveform 810 represents stator current IX in amperes, waveform 820 represents voltage source VBEMF in volts, and a waveform 850 representing the duty cycle of the PWM CONTROL signals before and after stator current commutation in percentage. Also included are threshold references 812 and 814 corresponding to positive and negative stator current thresholds determined by signal ISET, respectively. Angle reference TX represents when commutation of stator current IX is initiated, and angle TY represents when stator current IX has reached the negative stator current threshold 814. Interval 860 illustrates the period during which stator current IX is transitioning from threshold 812 to threshold 814. PWM CONTROL duty cycle is shown prior to and following interval 860. The PWM CONTROL duty cycle immediately preceding angle reference TX is labeled "PRE-COMMUTATION DUTY CYCLE," and the PWM CONTROL duty cycle immediately following angle reference TY is labeled "POST-COMMUTATION DUTY CYCLE."

Graph 800 illustrates the operation of motor 160 after the commutation feedback loop previously described has converged on the substantially optimal commutation time, as indicated by the values of PRE-COMMUTATION DUTY CYCLE and POST-COMMUTATION DUTY CYCLE being approximately equal. The commutation feedback loop can continue to operate to maintain a substantially optimal commutation time. Thus, brushless DC motor system 100 can compensate for variations in mechanical load applied to motor 160, or to changes in the speed of rotation resulting from changes made to the value of stator current threshold signal ISET.

Graph 800 also illustrates that when commutation is initiated at a substantially optimal time, both stator current IX and signal VBEMF intersect the midpoint between threshold 812 and 814 (zero-crossing) approximately halfway between angle references TX and TY. Thus, intervals, labeled "T1," and "T2" are substantially equal in value. Stator current IX and BEMF are substantially in phase with each other, and the mechanical power provided by motor 160 is substantially maximized.

Note that as illustrated in FIG. 1, feedback control module 120 is implemented using a microcontroller and current regulator 122, duty cycle threshold adjust 124, and commutator logic 126 are implemented using a combination of hardware and software. In other embodiments, different combinations of hardware and software can be used to implement portions of these modules. Moreover, current drive circuit 140 may be implemented with feedback control module 120 on a single integrated circuit.

Also current drive circuit 140 is shown as using MOSFETs 142, 144, 146, and 148. As used herein and as conventionally understood, "MOSFET" includes insulated gate field effect transistors having a polysilicon gates as well as those having metal gates.

Note that current drive circuit 140 illustrated at FIG. 1 includes two comparators 154 and 156 and two current sense resistors 146 and 152 to provide two SENSE signals. In an alternate embodiment a single comparator and a single resistor can be used to provide a single SENSE signal by connecting the source of MOSFET 144 to the source of MOSFET 150, and including the single resistor between this connection and ground, and the single comparator connected to the connected sources. In either implementation, the absolute magnitude of the stator current is compared to the value of signal ISET, even though the direction of stator current flow changes with each commutation.

The above-disclosed subject matter is to be considered illustrative, and not restrictive, and the appended claims are intended to cover all such modifications, enhancements, and other embodiments that fall within the true scope of the claims. Thus, to the maximum extent allowed by law, the scope of the present invention is to be determined by the broadest permissible interpretation of the following claims and their equivalents, and shall not be restricted or limited by the foregoing detailed description.

What is claimed is:

1. A control circuit for a brushless direct current (DC) motor comprising:
   a current drive circuit adapted to drive the brushless DC motor in a first polarity or a second polarity selectively in response to a control signal, and for sensing a current through the brushless DC motor to provide a current sense signal;
   a current loop regulator for varying a duty cycle of said control signal to regulate said current in response to said current sense signal, and for regulating said current to a selected one of a first current or a second current of opposite polarity to said first current based on a state of a polarity signal; and a commutation loop regulator for regulating a transition of said polarity signal in response to a comparison of a pre-commutation duty cycle value and a post-commutation duty cycle value.

2. The control circuit of claim 1 wherein said current loop regulator determines said post commutation duty cycle value as a value of said duty cycle when said current reaches said second current after said transition of said polarity signal.

3. The control circuit of claim 2 wherein said commutation loop regulator adjusts said transition until said pre-commutation duty cycle value and said post-commutation duty cycle value are substantially equal.

4. The control circuit of claim 3 wherein said commutation loop regulator comprises:
 a duty cycle threshold adjust circuit for adjusting a next pre-commutation duty cycle value based said pre-commutation duty cycle value and a difference between said pre-commutation duty cycle value and said post commutation duty cycle value; and
 a commutator logic circuit for changing said state of said polarity signal when said duty cycle approximately equals said next pre-commutation duty cycle value.

5. The control circuit of claim 1 wherein said current regulator and a commutation loop regulator are implemented using a microcontroller.

6. The control circuit of claim 5 wherein said microcontroller and said current drive circuit are combined on a single integrated circuit.

7. A control circuit for a brushless direct current (DC) motor comprising:
 a current drive circuit having an input for receiving a control signal, a first output adapted to be coupled to the brushless DC motor, and a second output for providing a current sense signal;
 a current loop regulator having a first input for receiving said current sense signal, a second input for receiving a polarity signal, a first output for providing said control signal, and a second output for providing a duty cycle signal indicative of a duty cycle of said control signal; and
 a commutation loop regulator having an first input for receiving said duty cycle signal, and an output for providing said polarity signal, wherein said commutation loop regulator changes said polarity signal to commutate the brushless DC motor in response to a comparison of a pre-commutation duty cycle value and a post-commutation duty cycle value.

8. The control circuit of claim 7 wherein said commutation loop regulator adjusts a commutation time until said pre-commutation duty cycle and said post-commutation duty cycle are substantially equal.

9. The control circuit of claim 7 wherein said current drive circuit comprises a metal-oxide-semiconductor field effect transistor (MOSFET) H-bridge.

10. The control circuit of claim 9 wherein said MOSFET H-bridge comprises:
 a first MOS transistor having a first current electrode coupled to a first power supply voltage terminal, a control electrode for receiving a first constituent signal of said control signal, and a second current electrode adapted to be coupled to a first terminal of a winding of the brushless DC motor;
 a second MOS transistor having a first current electrode coupled to said second current electrode of said first MOS transistor, a control electrode for receiving a second constituent signal of said control signal, and a second current electrode coupled to a second power supply voltage terminal;
 a third MOS transistor having a first current electrode coupled to said first power supply voltage terminal, a control electrode for receiving a third constituent signal of said control signal, and a second current electrode adapted to be coupled to a second terminal of said winding of the brushless DC motor; and
 a fourth MOS transistor having a first current electrode coupled to said second current electrode of said third MOS transistor, a control electrode for receiving a fourth constituent signal of said control signal, and a second current electrode coupled to said second power supply voltage terminal.

11. The control circuit of claim 10 wherein said second MOS transistor is coupled to said second power supply voltage terminal through a first resistor, and said fourth MOS transistor is coupled to said second power supply voltage terminal through a second resistor.

12. The control circuit of claim 11 wherein said current drive circuit further comprises:
 a first comparator having a first input terminal coupled to said second current electrode of said second MOS transistor, a second input terminal for receiving a voltage representative of a reference current, and an output terminal for providing a first constituent of said current sense signal;
 a second comparator having a first input terminal coupled to said second current electrode of said fourth MOS transistor, a second input terminal for receiving said voltage representative of said reference current, and an output terminal for providing a second constituent of said current sense signal.

13. The control circuit of claim 7 wherein said second control loop regulator changes a value of said polarity signal when said duty cycle signal equals a next pre-commutation duty cycle signal.

14. The control circuit of claim 7 wherein said current regulator has a second output for providing a post-commutation duty cycle signal as a value of said duty cycle signal after said commutation loop regulator has enabled a commutation of the brushless DC motor.

15. The control circuit of claim 14 wherein said commutation loop regulator comprises:
 a duty cycle threshold adjust circuit having a first input for receiving said post-commutation duty cycle signal, a second input for receiving a previous pre-commutation duty cycle signal, and an output for providing a next pre-commutation duty cycle signal; and
 a commutation logic circuit having a first input for receiving said duty cycle signal, a second input for receiving said next pre-commutation duty cycle signal, a first output for providing said previous pre-commutation duty cycle signal, and a second output for providing said polarity signal.

16. The control circuit of claim 7 wherein said current regulator and said commutation loop regulator are implemented using a microcontroller.

17. A method of controlling a brushless direct current (DC) motor comprising:
 regulating current through a winding of the brushless DC motor to substantially equal a positive reference current;
 determining a pre-commutation duty cycle value of a control signal provided to a current drive circuit;
 commutating said current;

regulating said current through said winding of the brushless DC motor to substantially equal a negative reference current;

determining a post-commutation duty cycle value of said control signal;

decreasing a next pre-commutation duty cycle if said post-commutation duty cycle value is less than said pre-commutation duty cycle value; and increasing said next pre-commutation duty cycle value if said pre-commutation duty cycle is greater than said post-commutation duty cycle value.

18. The method of claim 17 wherein said commutating said current comprises:

comparing a duty cycle of said control signal to said next pre-commutation duty cycle; and changing a polarity of said current through said winding of the brushless DC motor when said duty cycle of said control signal is substantially equal to said next pre-commutation duty cycle.

19. The method of claim 17 wherein said increasing comprises:

increasing said next pre-commutation duty cycle by an amount equal to a portion of a difference between said pre-commutation duty cycle and said post-commutation duty cycle.

20. The method of claim 19 wherein said decreasing comprises:

decreasing said next pre-commutation duty cycle by an amount equal to a portion of a difference between said post-commutation duty cycle and said pre-commutation duty cycle.

* * * * *

UNITED STATES PATENT AND TRADEMARK OFFICE
CERTIFICATE OF CORRECTION

| | | |
|---|---|---|
| PATENT NO. | : 7,969,108 B2 | Page 1 of 1 |
| APPLICATION NO. | : 12/327512 | |
| DATED | : June 28, 2011 | |
| INVENTOR(S) | : Sam J. B. W. Vermeir | |

It is certified that error appears in the above-identified patent and that said Letters Patent is hereby corrected as shown below:

In column 10, line 29, add "and" after "signal;".

Signed and Sealed this
Thirteenth Day of November, 2012

David J. Kappos
*Director of the United States Patent and Trademark Office*